(12) United States Patent
Chen et al.

(10) Patent No.: US 11,842,617 B2
(45) Date of Patent: Dec. 12, 2023

(54) FLOOD WARNING METHOD

(71) Applicants: Inventec (Pudong) Technology Corporation, Shanghai (CN); INVENTEC CORPORATION, Taipei (TW)

(72) Inventors: You-Gang Chen, Taipei (TW); Chi-Feng Wu, Taipei (TW)

(73) Assignees: INVENTEC (PUDONG) TECHNOLOGY CORPORATION, Shanghai (CN); INVENTEC CORPORATION, Taipei (TW)

( * ) Notice: Subject to any disclaimer, the term of this patent is extended or adjusted under 35 U.S.C. 154(b) by 522 days.

(21) Appl. No.: 17/114,790

(22) Filed: Dec. 8, 2020

(65) Prior Publication Data

US 2022/0084385 A1    Mar. 17, 2022

(30) Foreign Application Priority Data

Sep. 11, 2020 (CN) .......................... 202010951973.9

(51) Int. Cl.
*G08B 21/10* (2006.01)
*H04N 7/18* (2006.01)
*G06T 7/10* (2017.01)
*G08B 21/18* (2006.01)

(52) U.S. Cl.
CPC ............... *G08B 21/10* (2013.01); *G06T 7/10* (2017.01); *G08B 21/182* (2013.01); *H04N 7/181* (2013.01); *G06T 2207/20004* (2013.01)

(58) Field of Classification Search
CPC ...... G08B 21/10; G08B 21/182; G08B 21/20; G08B 21/18; G06T 7/10; G06T 2207/20004; G06T 7/11; G06T 2207/10016; G06T 2207/20076; G06T 2207/20081; G06T 2207/20084; G06T 2207/30192; G06T 2207/30232; G06N 3/045; H04N 7/183; H04N 7/181
See application file for complete search history.

(56) References Cited

U.S. PATENT DOCUMENTS

| 10,467,891 B1 * | 11/2019 | Bart | ..................... B64C 39/024 |
| 11,017,649 B1 * | 5/2021 | Chen | ..................... H04N 7/188 |
| 2007/0230744 A1 * | 10/2007 | Dronge | ................ G08B 13/194 382/103 |

(Continued)

FOREIGN PATENT DOCUMENTS

GB    2257598 A *  1/1993  ......... G06K 9/00362

*Primary Examiner* — Ojiako K Nwugo
(74) *Attorney, Agent, or Firm* — Locke Lord LLP; Tim Tingkang Xia, Esq (57) ABSTRACT

A flood warning method, adapted to a detection field, the method comprises: obtaining an original image associated with the detection field by a camera, wherein the original image includes a predetermined detection area; performing an image processing procedure on the original image by a processor to obtain a processed image, and overlapping the predetermined detection area with the processed image; calculating a ratio of a puddle area overlapping the predetermined detection area by the processor; determining whether the ratio falls within a warning range by the processor; and outputting a warning notification by the processor when the ratio falls within the warning range.

8 Claims, 7 Drawing Sheets

(56) References Cited

U.S. PATENT DOCUMENTS

2012/0134540 A1\* 5/2012 Han ................ G08B 13/19671
   382/103
2017/0193305 A1\* 7/2017 Apelbaum ............ G06V 20/46
2019/0158789 A1\* 5/2019 Snyder .................. G06V 40/20

\* cited by examiner

FLOOD WARNING METHOD

CROSS-REFERENCE TO RELATED APPLICATIONS

This non-provisional application claims priority under 35 U.S.C. § 119(a) on Patent Application No(s). 202010951973.9 filed in China on Sep. 11, 2020, the entire contents of which are hereby incorporated by reference.

BACKGROUND

1. Technical Field

This disclosure relates to a flood warning method, especially to a flood warning method that is able to determine whether there is puddle or flooding situation in the region of interest (ROI), and output a warning notification accordingly.

2. Related Art

In order to avoid property damage or casualties caused by flooding, water level detection systems are often installed on roadsides, river banks, lakes and any other areas close to water sources, to output warning notification to related agencies reduce damages caused by the flooding.

The mechanism of the current water lever detector is that, when the electrode in the detector is in contact with liquid, a closed circuit is formed through the contacted liquid, the water level is subsequently detected according to the flow-through current. Therefore, when determining whether there's flooding, an impedance between the electrodes can be determined to determine whether there's a puddle or flooding in the detection field.

However, the electrode part of the water level detector may be corroded due to alternating exposures to the sun and rain, which not only increases the cost of consumables due to replacing the detectors, but also reduces the detecting accuracy of the worn-out detector has not been replaced. In addition, usually, a plurality of detectors have to be installed in one detection field for the flooding situation of the field to be thoroughly detected. However, even if the detectors are installed, it is still unable to know if the detectors are installed in areas that are easily flooded, which may as well reduce the accuracy of detection.

SUMMARY

Accordingly, this disclosure provides a flood warning method.

According to one or more embodiment of this disclosure, a flood warning method, adapted to a detection field, the method comprising: obtaining an original image associated with the detection field by a camera, wherein the original image includes a predetermined detection area; performing an image processing procedure on the original image by a processor to obtain a processed image, and overlapping the predetermined detection area with the processed image; calculating a ratio of a puddle area overlapping the predetermined detection area by the processor; determining whether the ratio falls within a warning range by the processor; and outputting a warning notification by the processor when the ratio falls within the warning range.

According to one or more embodiment of this disclosure, a flood warning method, adapted to a detection field, the method comprising: obtaining an original image associated with the detection field by a camera, wherein the original image includes a plurality of feature points; performing an image processing procedure on the original image by a processor to obtain a processed image, and overlapping the feature points with the processed image; calculating an estimated water level by the processor, wherein the estimated water level is associated with a part of the feature points in the processed image, wherein said part of the feature points are included in a puddle area; and outputting a warning notification by the processor when the estimated water level falls within the warning range.

BRIEF DESCRIPTION OF THE DRAWINGS

The present disclosure will become more fully understood from the detailed description given hereinbelow and the accompanying drawings which are given by way of illustration only and thus are not limitative of the present disclosure and wherein.

DETAILED DESCRIPTION

The flood warning method of the present invention is adapted to detection fields such as roads, harbors, reservoirs, rivers, and ditches, etc., and every detection field preferably has a camera and a processor installed onto roadside devices such as street lights and traffic lights, so as to perform the flood warning method based on the images taken by the camera.

Figure 1:
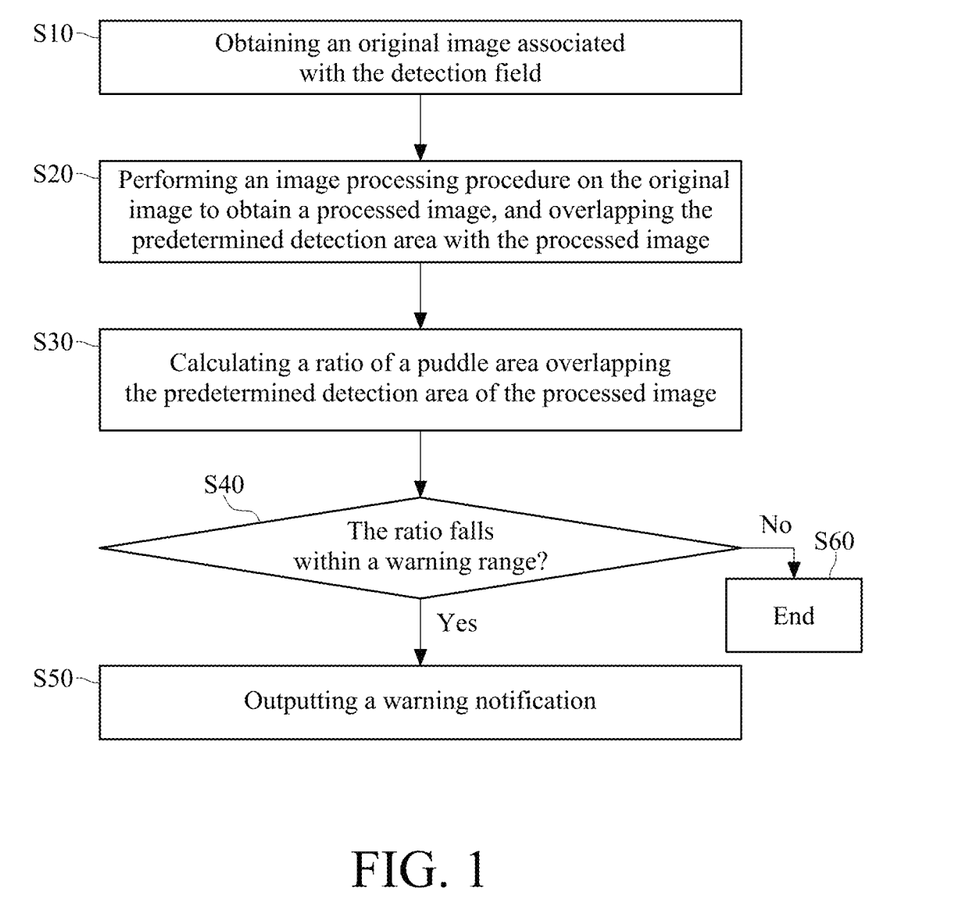
FIG. 1 is a flow chart of the flood warning method according to an embodiment of the present disclosure.
Figure 2A:
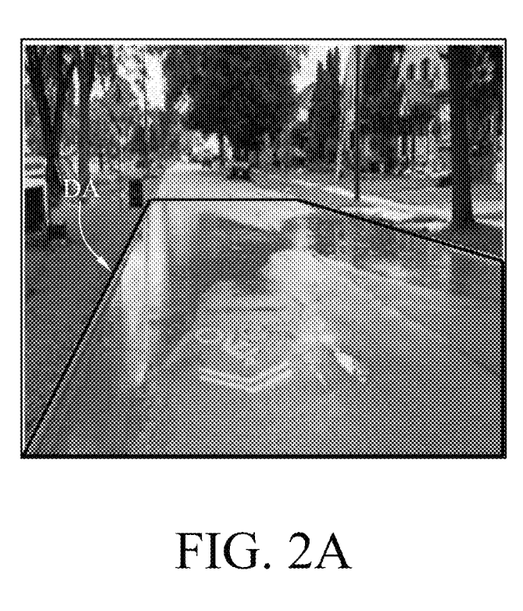
FIGS. 2A and 2B are diagrams of real-time images and processed images.
Figure 2B:
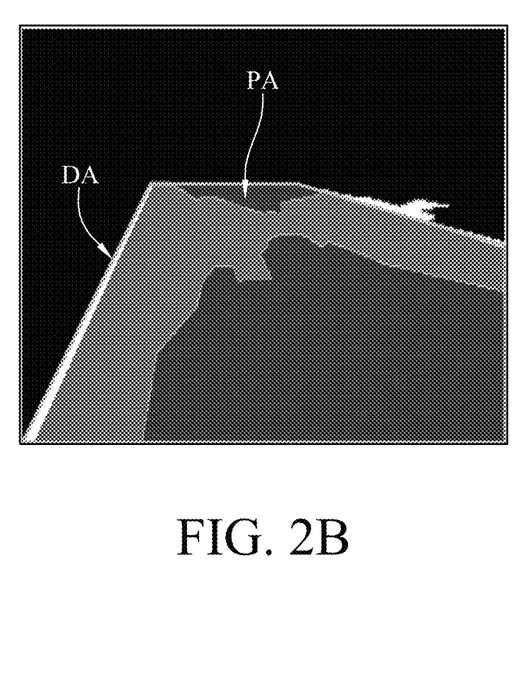

Please refer to FIG. 1 as well as FIGS. 2A and 2B, wherein FIG. 1 is a flow chart of the flood warning method according to an embodiment of the present disclosure; FIGS. 2A and 2B are diagrams of real-time images and processed images.

Step S10: obtaining an original image associated with the detection field, wherein the original image includes a predetermined detection area.

Take FIG. 2A as example, FIG. 2A is the original image obtained by the camera, and the area of the road in the original image is the detection field. The original image further includes a predetermined detection area DA. In other words, before detecting the puddle or flooding condition of the detection field based on the original image, one or more regions of interest (ROI) of the detection field can be set first, and the ROIs can be used as the predetermined detection area DA.

Step S20: performing an image processing procedure on the original image to obtain a processed image, and overlapping the predetermined detection area with the processed image.

The processor can train an artificial intelligence model (AI model) using previous original images and previous processed images obtained in advance, so that the trained AI model can perform the image processing procedure on the original image to output the processed image. Accordingly, the trained AI model can perform the image processing procedure on the obtained original image in a pixel-wise fashion to output the corresponding processed image. The AI model described can comprise, for example, convolutional neural network (CNN), recurrent neural network (RNN) or a combination of both, the present invention does not limit the type of the AI model.

In other words, the original image after being performed with the image process procedure can become the processed image as shown in FIG. 2B, and the predetermined detection area DA can overlap the processed image. That is, the processor performs the image process procedure to identify whether there is a puddle area in the original image, and if there is a puddle area in the original image, the processed image will include the puddle area PA as shown in FIG. 2B (the white area shown in FIG. 2B). It should be noted that, the puddle area described herein is merely an example, in addition to identifying whether there is a puddle area in the image, the processor can further determine the degree of ponding by identifying whether the road is dry or wet, or whether a splash is generated when a vehicle passes by.

Step S30: calculating a ratio of a puddle area overlapping the predetermined detection area of the processed image.

That is, since the predetermined detection area DA overlaps the processed image, the puddle area PA can overlap the predetermined detection area DA in the processed image when the processed image includes the puddle area PA. Accordingly, the processor can calculate a ratio of the puddle area PA, which overlaps the predetermined detection area DA, to the predetermined detection area DA, and use the calculated ratio as the said ratio.

Step S40: determining whether the ratio falls within a warning range.

The warning range is preferably used as the basis for determining whether the puddle reaches to flooding or dangerous level. Therefore, when the ratio of the puddle area PA overlapping the predetermined detection area DA falls within the warning range, it means that the predetermined detection area DA of the detection field has reached flooding level or is close to flooding level. The warning range is, for example, a range equal to or greater than 50%, the present invention does not limit the actual value of the warning range.

Step S50: outputting a warning notification.

That is, when the processor determines in step S40 that the ratio falls within the warning range, the processor can output the warning notification to the associated agency, wherein the warning notification preferably includes the flooding notice and the location of the detection field.

Please refer back to step S40, when the processor determines in step S40 that the ratio does not fall within the warning range, it means that the puddle area PA does not overlap the predetermined detection area DA, or the ratio of the puddle area PA overlapping the predetermined detection area DA does not reach the warning level. Therefore, the processor can perform step S60 to end the method, or return back to step S10 to continue obtaining real-time original images of the detection field, and determining the ponding condition of the predetermined detection area DA based on the obtained original images.

In addition, the processor is preferably an edge computing device, and the edge computing device can output the warning notification to the cloud server of the associated agency. The edge computing device can also output the processed image to the cloud server for it to calculate the ratio of the puddle area overlapping the predetermined detection area. Namely, the edge computing device can output the processed image to the cloud server, for the cloud server to determine the ponding condition of the predetermined detection area based on the processed image; the edge computing device can also determine the ponding condition of the predetermined detection area based on the processed image, and output the warning notification when the ratio falls within the warning range, the present disclosure is not limited thereto.

Besides, the processor implemented as the edge computing device can be sealed in a box (for example, in a street light control box) and installed at a location that is away from the ground. Therefore, when the weather is bad, the processor sealed in the box can still operate normally without being damaged. By implementing the processor as the edge computing device, it is able to avoid multiple frames of the real-time images being transmitted to the cloud server take up too much transmission capacity, and to avoid the cloud server carrying too much computing.

Figure 3:
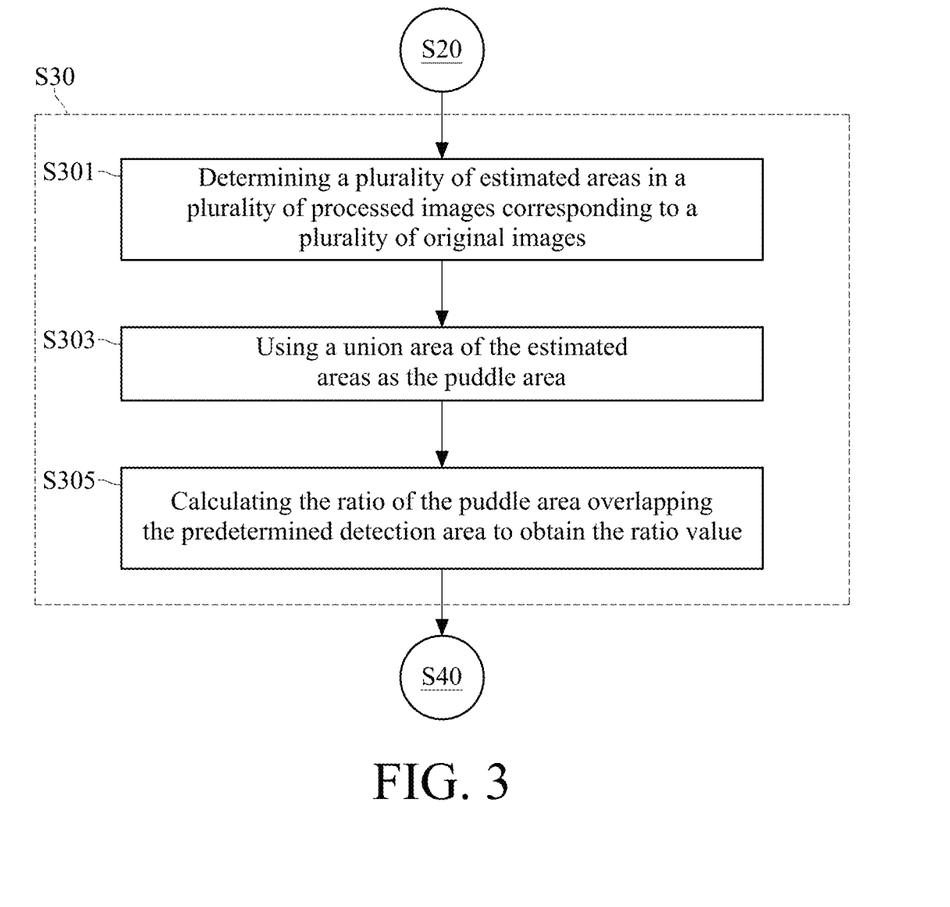
FIG. 3 is detailed flow chart of step S30 of FIG. 1.

Please refer to FIG. 3, wherein FIG. 3 is detailed flow chart of step S30 of FIG. 1. After obtaining the processed image and overlapping the predetermined detection area with the processed image (step S20 of FIG. 1), the processor can perform sub-steps S301, S303 and S305 of step S30, to identify the puddle area in the processed image more accurately.

Step S301: determining a plurality of estimated areas in a plurality of processed images corresponding to a plurality of original images.

Due to the fact that the detection field is often, for example, a road with frequent traffic, if the processor performs detection on only one frame of the original image, the obtained puddle area in the processed image may not be accurate enough since there might be vehicles passing by the puddle area at the exact same time when the original image is taken.

For that reason, the original image is preferably a plurality of continuous images (for example, 5 to 6 frames of images), or a plurality of images obtained sequentially in a time period. A plurality of processed images can be obtained by performing the image processing procedure on the original images. Further, if the original images have one or more blocks of puddle as shown in FIG. 2A, the blocks of puddle in the original images can be used as the estimated areas after the image processing procedure is performed.

Step S303: using a union area of the estimated areas as the puddle area.

The processor can unionize the estimated areas obtained in step S301 to obtain the union area, and use the union area as the puddle area to obtain an accurate puddle area.

For example, if there is a vehicle passing by one or more estimated areas when obtaining the multiple original images, a part of the estimated area may be blocked by the vehicle that passes by. Therefore, the processor can obtain the union area based on the estimated areas, and use the union area as the puddle area to obtain an accurate puddle area.

Step S305: calculating the ratio of the puddle area overlapping the predetermined detection area to obtain the ratio.

After obtaining the puddle area, the processor can calculate the ratio of overlapping between the puddle area and the predetermined detection area to obtain the said ratio, wherein the ratio is for determining whether the puddle reaches a warning condition.

Figure 4:
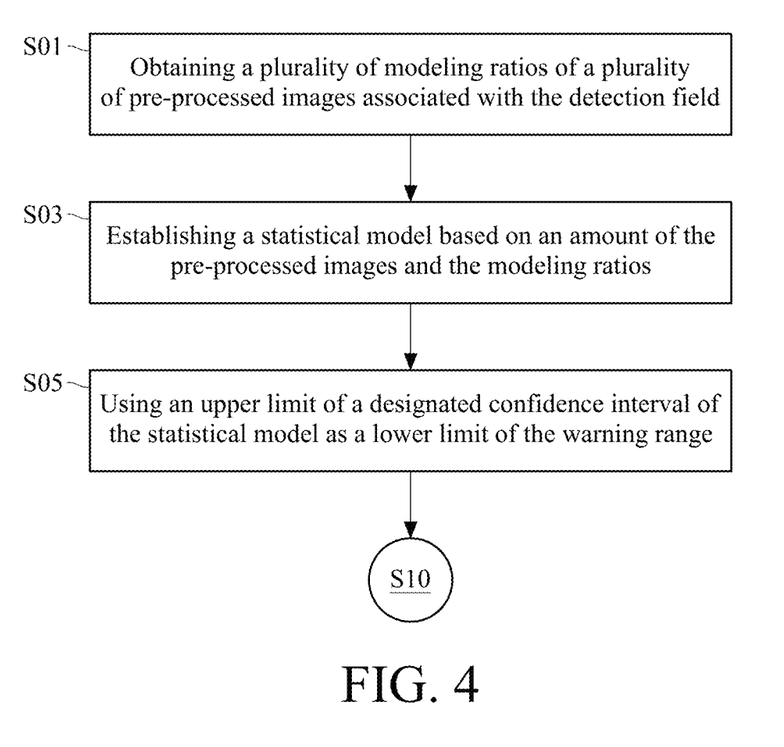
FIG. 4 is a flow chart of the flood warning method according to another embodiment of the present disclosure.
Figure 5:
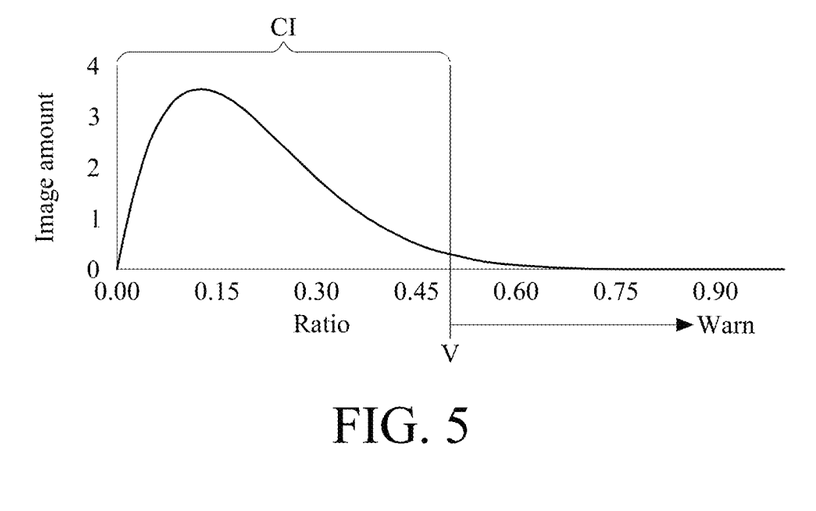
FIG. 5 is an exemplary diagram of a statistical model according to another embodiment of the present disclosure.

Please refer to FIG. 4 as well as FIG. 5, wherein FIG. 4 is a flow chart of the flood warning method according to another embodiment of the present disclosure; FIG. 5 is an exemplary diagram of a statistical model according to another embodiment of the present disclosure. Steps S01, S03 and S05 shown in FIG. 4 are preferably performed before step S10 of FIG. 1, so as to establish a statistical model corresponding to the detection field before performing flood detection on the detection field to obtain a warning range suitable for the detection field.

Before obtaining original images associated with the detection field by the camera (step S10), the processor can perform step S01: obtaining a plurality of modeling ratios of a plurality of pre-processed images associated with the detection field.

In other words, the camera can pre-shoot the detection field for a period of time to obtain a plurality of original images associated with the detection field. The processor then can perform the image processing procedure on the original images to obtain the pre-processed images.

Also, the processor can overlap the predetermined detection area on the pre-processed images and perform step S30 as previously described. Therefore, the processor can calculate a ratio of a puddle area in every pre-processed image overlapping the predetermined detection area, and use the ratios as the modeling ratios.

Step S03: establishing a statistical model based on an amount of the pre-processed images and the modeling ratios.

That is, the processor can establish a Gaussian distribution model (as shown in FIG. 5) based on the amount of the pre-processed images and the modeling ratios, and use the Gaussian distribution model as the statistical model. The processor can use the amount of the pre-processed images as the vertical axis of the Gaussian distribution model (image amount); and use the modeling ratios as the horizontal axis of the Gaussian distribution model (ratio). Accordingly, the established statistical model can be more in line with the actual conditions of the detection field. The Gaussian distribution model and the settings of its vertical axis and horizontal axis described are only examples, the present invention does not limit the implementation of the statistical model.

Step S05: using an upper limit of a designated confidence interval of the statistical model as a lower limit of the warning range.

That is, the statistical model can have a designated confidence interval CI, so that the processor can use the ratio corresponding to the upper limit of the designated confidence interval CI as the lower limit V of the warning range Warn. For example, the designated confidence interval CI of the statistical model shown in FIG. 5 is an interval within 95%. Therefore, if the upper limit of the 95% designated confidence interval CI corresponds to a 50% ratio V, the processor can use the 50% ratio V (use a value of the horizontal axis that the upper limit of the designated confidence interval CI corresponds to as the ratio V) as the lower limit of the warning range Warn. Accordingly, if a calculated ratio that is obtained in the subsequent step S30 is greater than 50%, the calculated ratio is determined to fall within the warning range Warn, and the warning notification is subsequently output.

Moreover, in actual detection, regardless of the calculated ratio, the ratio can be used to update the statistical model, so that the statistical model and the warning range based on the designated confidence interval can be more in line with the current or normal conditions of the detection field. For example, in a detection field where it rains frequently, if the ratio of a predetermined detection area corresponding to the detection field is often higher, the upper limit of the designated confidence interval is also higher. Therefore, the lower limit of the warning range corresponding to the predetermined detection area may also be higher to avoid false warning notifications.

In addition, if there is a temporary abnormal situation in the predetermined detection area (for example, a temporary puddle is formed due to construction), the statistical model can be updated to avoid false warning notifications being issued due to the temporary abnormal situation.

Figure 6:
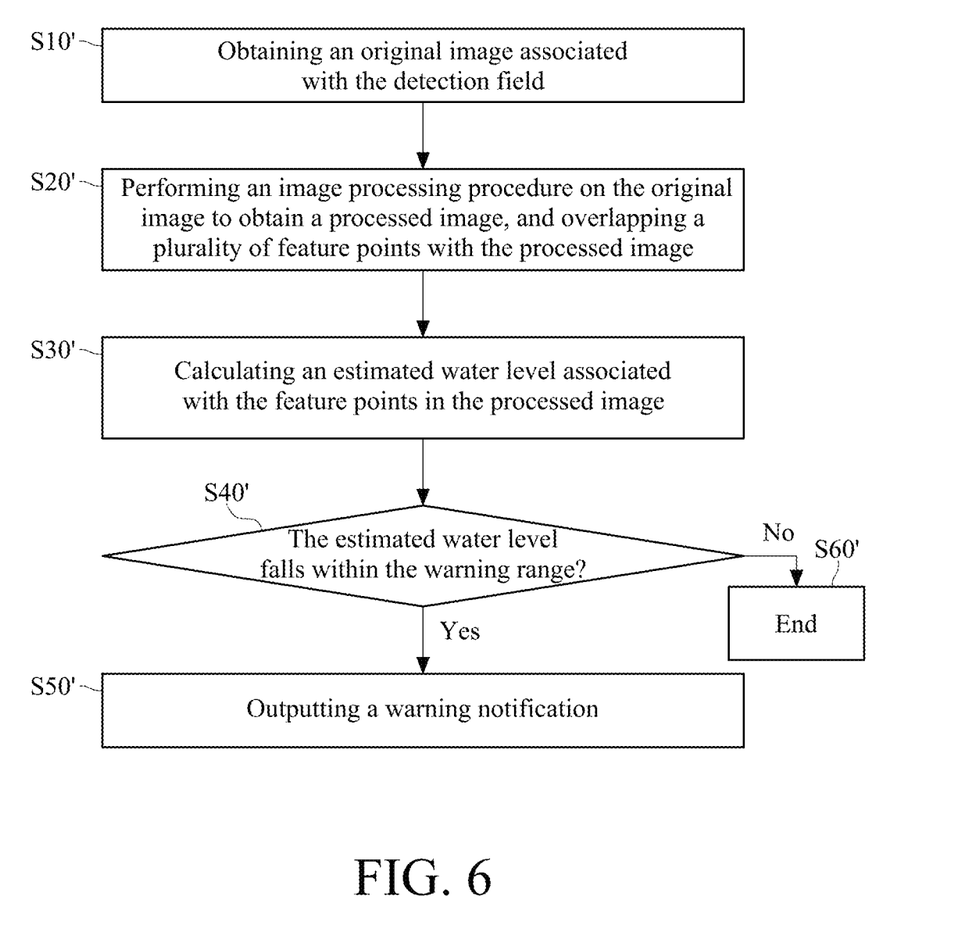
FIG. 6 is a flow chart of the flood warning method according to yet another embodiment of the present disclosure.
Figure 7A:
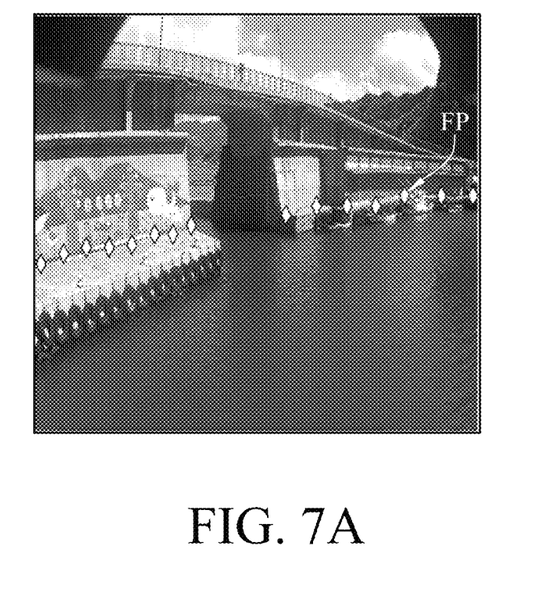
FIGS. 7A and 7B are diagrams of real-time images and processed images.
Figure 7B:
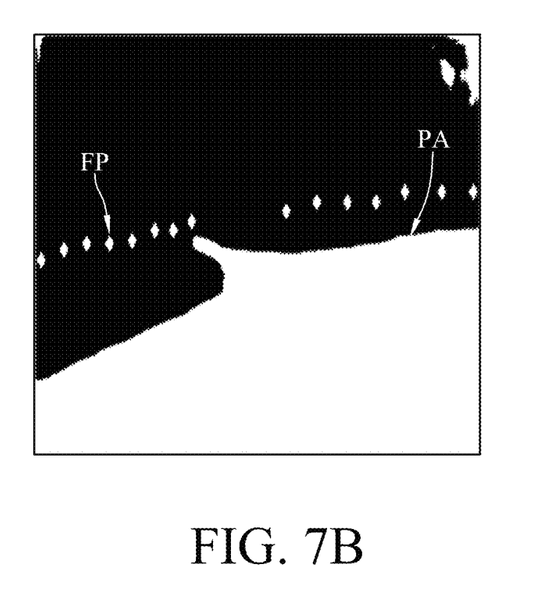

Please refer to FIG. 6 as well as FIGS. 7A and 7B, wherein FIG. 6 is a flow chart of the flood warning method according to yet another embodiment of the present disclosure; FIGS. 7A and 7B are diagrams of real-time images and processed images.

Steps S10', S50' and S60' shown in FIG. 6 are implemented in the same manner as steps S10, S50 and S60 shown in FIG. 1, so steps S10', S50' and S60' will not be repeated herein. The differences lie in that, steps S20', S30' and S40' of the flood warning method shown in FIG. 6 are different from the steps S20, S30 and S40 shown in FIG. 1.

According to FIG. 6, after obtaining the original image (step S10'), the processor can then perform step S20': performing an image processing procedure on the original image to obtain a processed image, and overlapping a plurality of feature points on the processed image.

As shown in FIG. 7A, the original image can include a plurality of feature points FP. Therefore, after obtaining the processed image, the processor can overlap the feature points FP on the processed image as shown in FIG. 7B.

Step S30': calculating an estimated water level associated with the feature points in the processed image.

The estimated water level is associated with a part of the feature points included in a puddle area among the feature points in the processed image, wherein said part of the feature points are included in a puddle area. To be more specific, the estimated water level is, for example, a ratio of the amount of feature points included in a puddle area to the total amount of feature points. Take FIG. 7B as an example, since the puddle area PA does not cover any one of the feature points FP, the estimated water level calculated in step S30' is 0. In another embodiment that is not illustrated, if the total amount of feature points FP in another processed image is 16, and the puddle area PA in the another processed image covers 4 feature points FP, then the estimated water level corresponds to the another processed image is 25%.

In yet another embodiment that is not illustrated, every feature point FP can have a different weight value. For example, the feature point FP that is closer to the road can have a weight value that is greater than 1, and the feature point FP that is farther away from the road can have a weight value that is equal to or smaller than 1. Therefore, when the puddle area PA covers the feature point FP with a weight value that is greater than 1, the estimated water level will also increase adaptively. Accordingly, by setting different weight values for feature points FP at different locations, the monitoring of feature areas in the detection field can be strengthened.

In addition, similar the sub-steps of step S30 shown in FIG. 3, the method of obtaining the estimated water level shown in step S30' of FIG. 6 can be first determining a plurality of estimated areas in a plurality of processed images, and using a union area of the estimated areas as the puddle area, then calculating the amount of feature point that is included in the puddle area and using a ratio of the amount of feature point that is included in the puddle area to the total amount of feature point as the estimated water level.

After the estimated water level is calculated, the processor can perform step S40' in FIG. 6 to determine whether the estimated water level falls within the warning range. The processor can perform step S50' to output the warning notification when the estimated water level falls within the warning range; and perform step S60' to end the method when the estimated water level does not fall within the warning range.

Moreover, please refer back to step S10', before obtaining the original image, the processor can perform steps S01, S03 and S05 as shown in FIG. 4 to establish a statistical model corresponding to the detection field based on the modeling ratios. It should be noted that, the processor obtaining the modeling ratios for the embodiment of FIG. 6 is based on the amount of the feature point FP. That is, the modeling ratios of the embodiment of FIG. 6 is a ratio of the amount of feature points FP that is included in the puddle area PA in the pre-processed images, to the total amount of feature points FP in the pre-processed images, wherein the modeling ratios can also be obtained based on the feature points FP having different weight values.

Further, the estimated water level obtained in step S30' can be used to update the statistical model, for the statistical model to be more in line with the current situation of the detection field.

In view of the above description, the flood warning method according to one or more embodiments of the present invention, the puddle or flood situation of a detection field can be monitored in real time, and comparing to the conventional water level detector, the flood warning method of the present invention will not cause damage to the detection device or even affect the detection accuracy due to weather changes. In addition, the flood warning method according to one or more embodiments of the present invention, the puddle or flood situation of the detection field can be effectively monitored without the need to install multiple detection devices with high cost. Furthermore, the flood warning method according to one or more embodiments of the present invention, not only can there be a corresponding detection standard for each detection area, but also the detection standard can be updated in a proper manner, so that the result of determining whether the area is flooded can be more accurate. Even if the initially planned detection area is not suitable for detecting the puddle or flood situation of the area, with the flood warning method of the present invention, the detection area can be re-assign the detection area without manually replacing or moving the detection device.

The present disclosure has been disclosed above in the embodiments described above, however it is not intended to limit the present disclosure. It is within the scope of the present disclosure to be modified without deviating from the essence and scope of it. It is intended that the scope of the present disclosure is defined by the following claims and their equivalents.

What is claimed is:

1. A flood warning method, adapted to a detection field, the method comprising:
obtaining an original image associated with the detection field by a camera, wherein the original image includes a predetermined detection area;
performing an image processing procedure on the original image by a processor to obtain a processed image, and overlapping the predetermined detection area with the processed image;
calculating a ratio of a puddle area overlapping the predetermined detection area by the processor;
determining whether the ratio falls within a warning range by the processor; and
outputting a warning notification by the processor when the ratio falls within the warning range, wherein the processor is an edge computing device, and outputting the warning notification by the processor comprises: outputting the warning notification to a cloud server by the edge computing device.

2. The flood warning method according to claim 1, wherein before obtaining the original image associated with the detection field, the method further comprises:
obtaining a plurality of modeling ratios of a plurality of pre-processed images associated with the detection field;
establishing a statistical model based on an amount of the pre-processed images and the modeling ratios by the processor; and
using an upper limit of a designated confidence interval of the statistical model as a lower limit of the warning range.

3. The flood warning method according to claim 2, wherein after calculating the ratio of the puddle area overlapping the predetermined detection area in the processed image, the method further comprises:
updating the statistical model by the ratio.

4. The flood warning method according to claim 1, wherein calculating the ratio of the puddle area overlapping the predetermined detection area in the processed image comprises:
determining a plurality of estimated areas in a plurality of processed images corresponding to a plurality of original images by the processor;
using a union area of the estimated areas as the puddle area; and
calculating a ratio of the puddle area, which overlaps the predetermined detection area in the processed image, to the predetermined detection area by the processor to obtain the ratio.

5. A flood warning method, adapted to a detection field, the method comprising:
obtaining an original image associated with the detection field by a camera, wherein the original image includes a plurality of feature points;
performing an image processing procedure on the original image by a processor to obtain a processed image, and overlapping the feature points with the processed image;
calculating an estimated water level by the processor, wherein the estimated water level is associated with a part of the feature points in the processed image, wherein said part of the feature points are included in a puddle area;
determining whether the estimated water level falls within a warning range by the processor; and
outputting a warning notification by the processor when the estimated water level falls within the warning range, wherein the processor is an edge computing device, and outputting the warning notification by the processor comprises: outputting the warning notification to a cloud server by the edge computing device.

6. The flood warning method according to claim 5, wherein before obtaining the original image associated with the detection field by the camera, the method further comprises:
obtaining a plurality of modeling ratios of a plurality of pre-processed images associated with the detection field;

establishing a statistical model based on an amount of the pre-processed images and the modeling ratios by the processor; and using an upper limit of a designated confidence interval of the statistical model as a lower limit of the warning range.

7. The flood warning method according to claim 6, wherein after calculating the estimated water level, the method further comprises:

updating the statistical model by the estimated water level.

8. The flood warning method according to claim 5, wherein calculating the estimated water level by the processor comprises:

determining a plurality of estimated areas in a plurality of processed images corresponding to a plurality of original images by the processor;

using a union area of the estimated areas as the puddle area; and calculating an amount of feature points included in the puddle area, and using a ratio of the amount of feature points included in the puddle area to a total amount of the feature points as the estimated water level.

* * * * *